United States Patent [19]
Glennon

[11] Patent Number: 4,502,106
[45] Date of Patent: Feb. 26, 1985

[54] CURRENT SOURCE SINE WAVE INVERTER

[75] Inventor: Timothy F. Glennon, Rockford, Ill.

[73] Assignee: Sundstrand Corporation, Rockford, Ill.

[21] Appl. No.: 542,577

[22] Filed: Oct. 17, 1983

[51] Int. Cl.³ .............................................. H02H 7/122
[52] U.S. Cl. ....................................... 363/56; 363/98; 363/132
[58] Field of Search ................. 363/17, 35, 37, 40–43, 363/55–58, 80, 95, 97–98, 131–139

[56] References Cited

U.S. PATENT DOCUMENTS

| | | | |
|---|---|---|---|
| 3,737,755 | 6/1973 | Calkin et al. | 363/17 |
| 3,742,330 | 6/1973 | Hodges et al. | 363/41 |
| 3,829,754 | 8/1974 | Rettig | 363/37 |
| 3,930,194 | 12/1975 | Walker | 363/56 |
| 4,099,225 | 7/1978 | Nygaard | 363/98 X |

*Primary Examiner*—Peter S. Wong
*Attorney, Agent, or Firm*—Wood, Dalton, Phillips, Mason & Rowe

[57] ABSTRACT

An n-phase current source inverter for developing n-phase AC power from DC power generated by a DC source having first and second terminals each coupled to the inverter through first and second bus lines, respectively, including a choke coil connected between the first DC bus line and a DC rail of the inverter. A switch is coupled between the DC rail and the second bus line and means are included for sensing the current level through the choke coil when the inverter is on. Means are connected between the sensing means and the switch for closing the switch when the inverter is off or when the inverter is disconnected from the DC source to maintain the current through the choke coil at a level sufficient to provide current to the load while maintaining the voltage at the output of the inverter at a regulated level.

16 Claims, 4 Drawing Figures though it should be understood that the present invention is in no way limited to a three-phase inverter but may be used in conjunction with an n-phase inverter, where n may be an integer greater than or equal to one.

CURRENT SOURCE SINE WAVE INVERTER

DESCRIPTION

Background of the Invention

The present invention relates generally to n-phase inverters and more particularly to a current source inverter in which current is delivered to a load to maintain the voltage across the load at an approximately constant level.

Inverters for developing polyphase AC power from a DC source typically includes n pairs of transistors connected across first and second DC rails which carry current from the DC source. Such types of inverters are subject to operational difficulties, such as ripple developed by the DC source and the return of regenerative currents developed by the load during off periods of the inverter to the DC source.

One attempt to overcome the above-noted problems is to utilize a large capacitor in parallel with the DC source. The capacitor absorbs regenerative currents and is sometimes used in conjunction with an inductor in an LC filter. However, such types of filters become unreasonably large and heavy for use in applications requiring minimal size and weight.

One way to overcome the ripple problem is to utilize an inductor in the DC bus to cause the inverter to operate as a current source, such as that disclosed in Rettig U.S. Pat. No. 3,829,754. Such a current source inverter does not require DC bus filter capacitors since the current developed by the inverter is somewhat independent of DC supply voltage. However, this circuit does not maintain current through the inductor during off periods of the inverter, and hence the load voltage may drop below an optimum level and/or there may not be sufficient load current to trip breakers between the inverter and the load in an overload condition. Also, this circuit does not prevent the return of regenerative currents developed by the load to the DC source.

One proposed solution to the regenerative current problem is disclosed in Glennon U.S. patent application Ser. No. 542,578, filed Oct. 17, 1983, entitled "Pulse Width Modulated Inverter for Unbalanced and Variable Power Factor Loads" and assigned to the assignee of the instant application. Such an inverter includes means for sensing a regenerative condition in the DC bus, means for decoupling the DC source from the inverter and means for shunting the regenerative current in the inverter back to the load and away from the DC source.

However, in the case of the current source inverter described above, which is turned on and off under pulse width modulation control, the current through the DC bus and the inductor is interrupted when the inverter is off, thereby resulting in a momentary current deficiency in the inverter when the inverter is turned back on.

SUMMARY OF THE INVENTION

In accordance with the present invention, an n-phase current source inverter includes means for maintaining the current through a DC bus at a level sufficient to maintain load voltage at a substantially constant level. Current regulating circuitry in the form of an inductor is connected between the DC bus and a rail of the inverter. Current sensors detect the level of current through the DC bus and the load current developed at the output of the n-phase inverter. The sensed currents are compared to determine if additional current from the DC source is needed. If this is the case, a switch between the inverter rail and a neutral terminal of the DC source is closed when the inverter is off to allow current to circulate through the inductor so that a ready source of current is available during on periods of the inverter.

The present invention may be combined with the circuitry shown in the above noted German patent application to reduce DC source ripple and to reduce the return of regenerative currents to the DC source. Such a circuit would allow the complete elimination of a DC bus capacitor filter, thereby reudcing the size and weight of the resulting power supply system.

DESCRIPTION OF THE PREFERRED EMBODIMENTS

Figure 1:
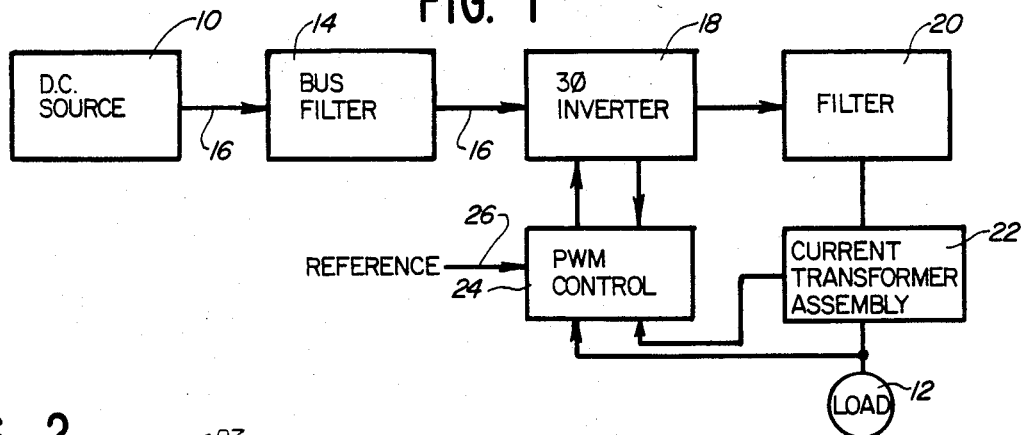
FIG. 1 is a block diagram of an n-phase DC-to-AC inverter system.

Referring now to FIG. 1, there is illustrated an n-phase inverter system which converts DC power developed by a DC source 10 into polyphase AC power to drive a load 12. The inverter system shown in the drawings has been illustrated as a three-phase inverter system for driving a three-phase load; however, it should be understood that the present invention is in no way limited to a three-phase inverter but may be used in conjunction with an n-phase inverter, where n may be an integer greater than or equal to one.

The DC source may be a generator and rectifier arrangement which includes control and protection circuitry for operating the generator. Alternatively, the DC source 10 may simply be a battery or other source of DC potential. In any event, the source 10 includes two terminals at first and second voltages and a neutral or common terminal which is at a voltage midway between the first and second voltage levels.

The output from the source 10 is coupled through a bus filter 14 over DC bus lines 16 to an inverter 18. The inverter 18 develops three-phase AC power from the DC power on the lines 16, in a manner more specifically noted below.

The inverter 18 is connected through a filter 20 and a current transformer assembly 22 to the load 12. A current sensing signal is developed by the current transformer assembly 22 and is coupled to a pulse width modulation, or PWM, control 24 which controls switches in the inverter 18. The PWM control 24 also receives a signal representing the line-to-neutral voltage of each of the phases delivered to the load 12 as well as a reference signal on a line 26.

The PWM control 24 is conventional and provides time ratio control for the switches in the inverter 18.

Figure 2:
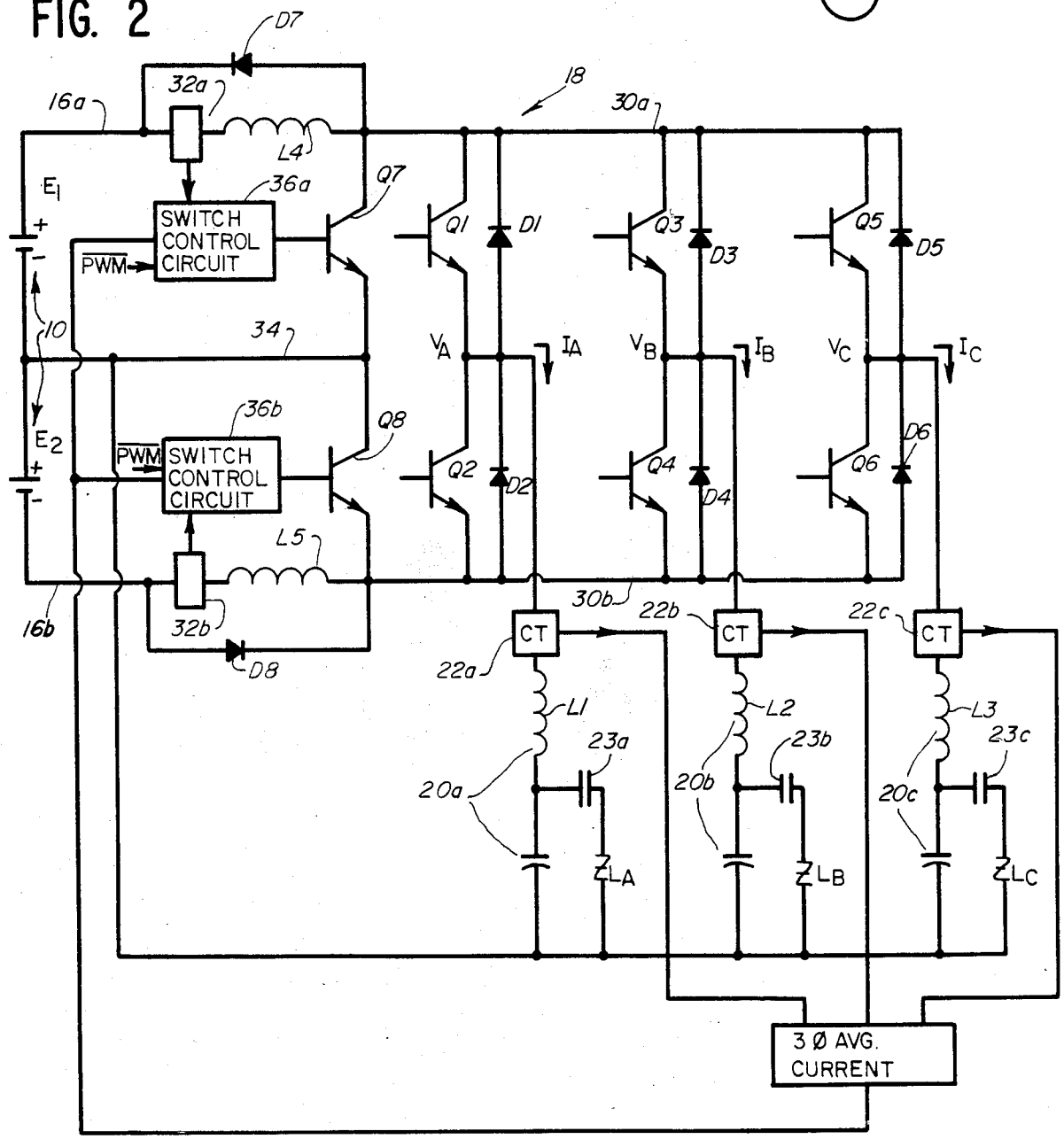
FIG. 2 is a schematic diagram of the inverter output stage, filter, current transformer assembly and load shown in block diagram form in FIG. 1.

Referring now to FIG. 2, there is illustrated in greater detail the inverter 18 shown in FIG. 1. The inverter 18 is shown as a three-phase inverter, it being understood that a greater or lesser number of phase voltages may be developed by the inverter 18.

Three pairs of switches are connected across first and second inverter rails 30a,30b with phase voltages $V_A$, $V_B$ and $V_C$ and phase currents $I_A$, $I_B$ and $I_C$ being developed at the junctions between switches of each pair. In the illustrated embodiment, the switches comprise bipolar switching transistors Q1–Q6 each having a free wheeling diode D1–D6 connected across the collector-emitter circuit thereof, respectively. It should be understood that other types of switches may be utilized, such as silicon controlled rectifiers, triacs or the like provided that appropriate gating and commutating circuitry is provided therefor.

The phase currents are connected through current transformers 22a, 22b, 22c and LC filters 20a,20b, 20c to respective phases of the load 12. For convenience, the impedance of the phases of the load 12 are shown as lumped quantities designated $Z_{LA}$, $Z_{LB}$ and $Z_{LC}$. Three sets of breaker contacts 23a, 23b and 23c are disposed between the filter outputs of the inverter and the loads $Z_{LA}$, $Z_{LB}$ and $Z_{LC}$.

Current regulating circuitry is connected between the DC bus lines 16a, 16b and first and second DC rails 30a, 30b. The current regulating circuitry is shown in the form of choke coils or inductors L4 and L5 which prevent rapid variations in current through the bus lines 16. Additional current regulating circuitry may be utilized in conjunction with the inductors L4 and L5, if desired.

It should be noted that the present invention using a current source is particularly useful in installations where the DC bus lines 16 are relatively long, thereby causing the impedance of the bus lines 16 to be somewhat inductive. Such an arrangement can cause voltage spikes of large magnitude to be generated on the bus lines 16 when the inverter is switched on-to-off or off-to-on. The choke coils L4 and L5 together with two transistors Q7 and Q8, described more specifically below, provide current source operation to remedy this problem by smoothing the current through the bus lines 16 and hence prevent the generation of large voltage spikes thereon.

Two current sensors 32a, 32b sense the current through the inductors L4 and L5, respectively. In the preferred embodiment, the current sensors 32a, 32b comprise Hall effect transducers which are non-contacting devices which do not affect the current in the DC bus 16.

Diodes D7 and D8 are connected across the inductors L4 and L5 and the current sensors 32a, 32b, respectively, to dissipate any back EMF generated by the inductors.

As previously noted, the inverter switches Q1–Q6 are operated under control of a pulse width modulated, or PWM, waveform developed by the PWM control 24. When the PWM waveform is in a low state, all of the transistors Q1–Q6 in the inverter are tuned off. Consequently, no current from the DC source is flowing in each of the inverter rails 30a, 30b at this time.

The transistors Q7 and Q8 are connected between the inductors L4 and L5, respectively and a neutral bus line 34 connected to the neutral terminal of the DC source 10. The transistors Q7 and Q8 are controlled by switch control circuits 36a, 36b, respectively, which operate the transistors Q7 and Q8 in response to the current sensed by the current sensors 32a, 32b, the load current as sensed by the current transformers 22a–22c and the PWM wave. In general, when sensed and filtered load current is greater than the current through one or both of the inductors L4 and L5, this condition defines an increasing load current and one or both of the switches Q7 and Q8 is turned on while the PWM wave is in a low state (i.e., when the inverter is off) so that the current flow through the inductors L4 and L5 is increased. Subsequently, when the PWM wave reassumes a high state and turns on three of the six switches in the inverter, the transistors Q7 and Q8 are turned off and current is immediately available to energize the load phases and maintain the phase voltages $V_A$, $V_B$ and $V_C$ at a regulated level.

Figure 3:
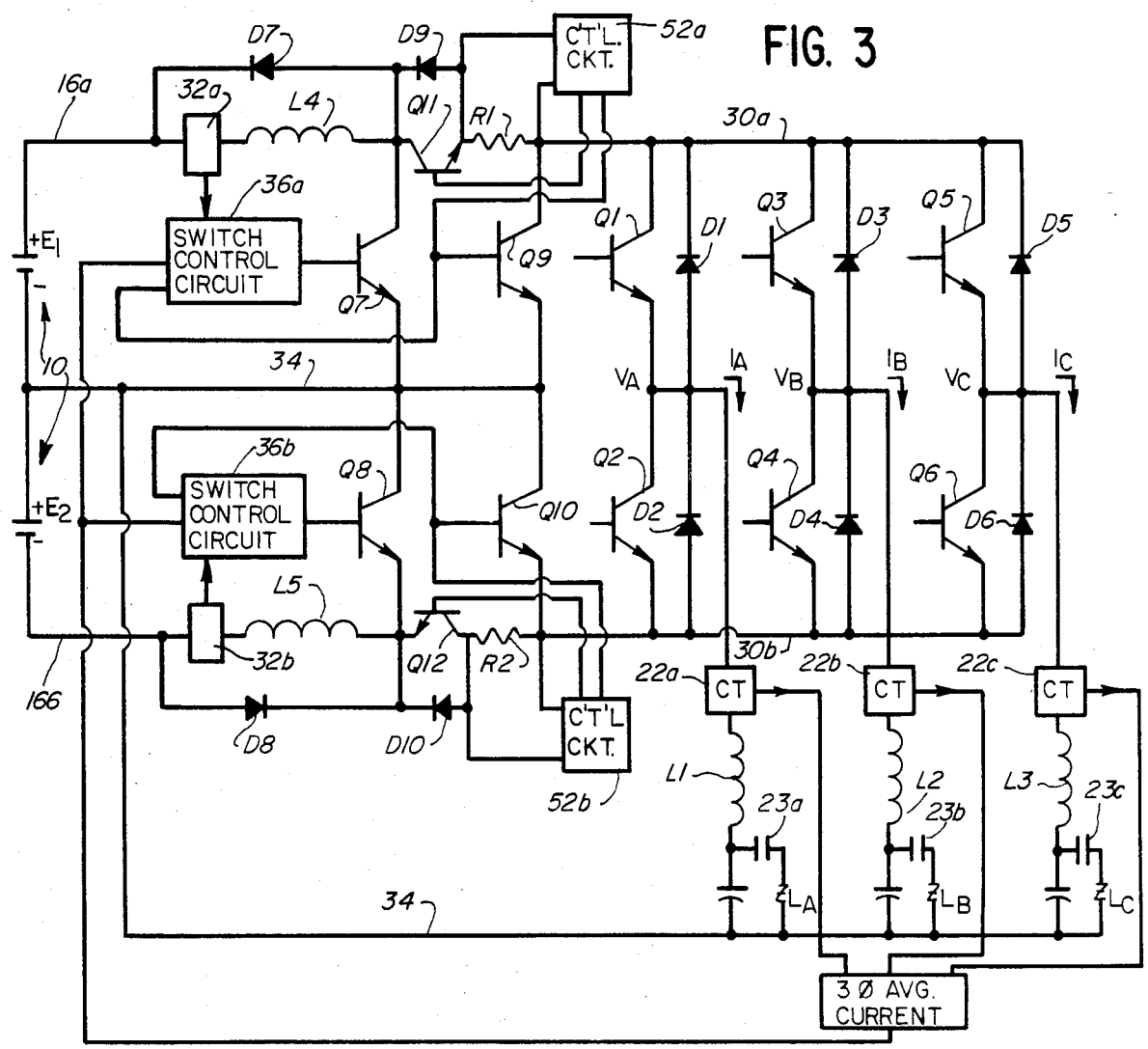
FIG. 3 is a schematic diagram of an inverter output stage, filter, current transformer assembly and load which may be used in lieu of that shown in FIG. 2.

Referring now to FIG. 3, there is illustrated an alternative inverter output stage 18 which may be used in lieu of that shown in FIG. 2. The circuits shown in FIGS. 2 and 3 are identical with the exception of the addition of transistors Q9–Q12, diodes D9 and D10, resistors R1 and R2 and control circuits 52a, 52b. This additional circuitry is utilized to prevent the return of regenerative currents developed by the load to the DC source. The operation of this circuitry is described in Glennon U.S. patent application Ser. No. 542,578, filed Oct. 17, 1983, entitled "Pulse Width Modulated Inverter for Unbalanced and Variable Power Factor Loads" and assigned to the assignee of the instant application.

Briefly, the voltages across the resistors R1 and R2 are sensed to determine if a regenerative condition has arisen. For example, if the voltage across the resistor R1 indicates that the current therethrough has switched to a direction opposite to the normal current flow therethrough, then the transistor Q9 is turned on and the transistor Q11 is turned off by a disconnect signal from the control circuit 52a to decouple the DC source from the inverter and to route the regenerative current back through the neutral connection 34 and the load 12. A more detailed description of the operation of the circuitry may be obtained by reference to the above-noted patent application which is hereby incorporated by reference.

Figure 4:
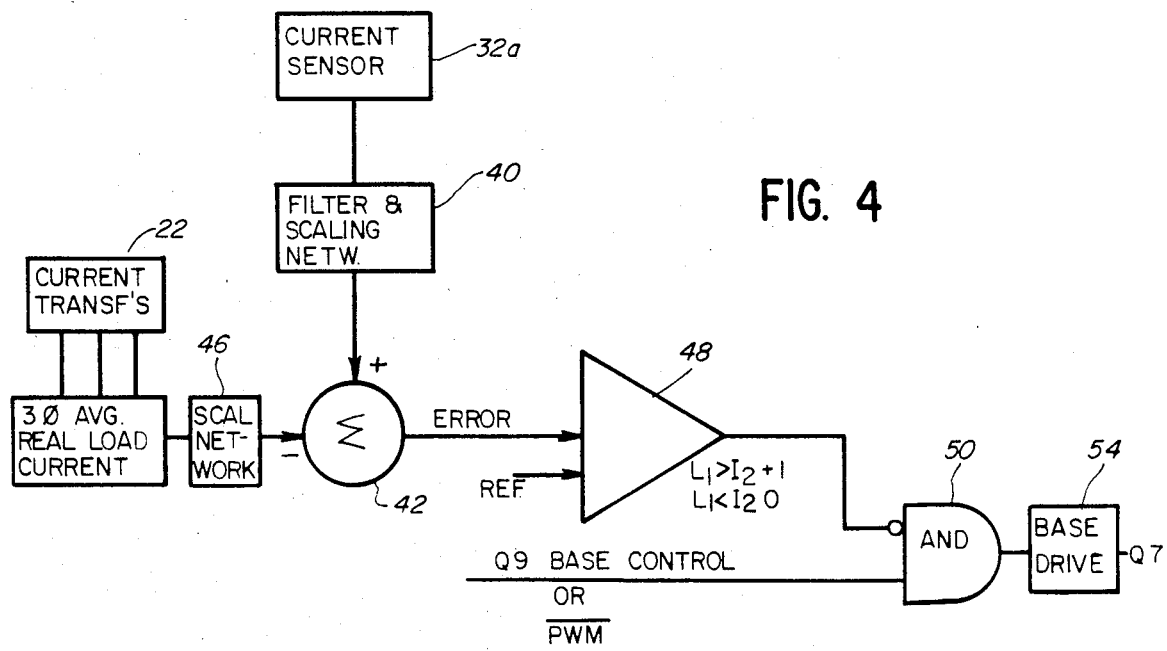
FIG. 4 is a schematic diagram of one of the switch control circuits shown in block diagram form in FIGS. 2 and 3.

Referring now to FIG. 4, there is illustrated one of the switch control circuits 36a,36b shown in FIGS. 2 and 3. The switch control circuits 36a,36b are identical, with the exceptions noted below. Hence, only the switch control circuit 36a will be discussed in detail.

As seen in FIG. 4, the output from the current sensor 32a is coupled through a filter and scaling network 40 to a summing junction 42. The filter 40 causes a lag with respect to the current sensed by current transformers 22. Therefore, if the output current increases, an error is produced by virtue of the lag introduced by the filter 40 in the signal developed by the current sensor 32a. The signals representing load current from the current transformers 22 are connected to a three phase average current circuit 44 which develops a signal representing the average real load current of the three phases. This signal is connected through a scaling network 46 to a second input of the summing junction in a sense opposite that of the output from the current sensor 32a.

The output from the summing junction 42 is an error signal representing the difference between the current through the inductor L4 and the three-phase average current. This error signal is compared with a reference signal in a comparator 48 which develops a comparison signal which is in one of two states depending upon the comparison performed by the summing junction 42 and the comparator 48. The comparison signal is in a high state when the filtered current through the inductor L1 is greater than the load current and is in a low state when the filtered inductor current is less than the load current.

The comparison signal is connected to an inverting input of an AND gate 50 which receives one of two signals as a second input. In the case of the circuitry shown in FIG. 2, the AND gate 50 receives as the second input an inverted version of the PWM wave. In the case of the circuitry shown in FIG. 3, the AND gate 50 receives as the second input a control signal which operates the transistor Q9. The control signal for the transistor Q9 is an inverted version of the control signal for the transistor Q11 which is operated by the disconnect signal to decouple the choke call L4 from the rail 30a during a regenerative condition, as previously noted.

The signal from the AND gate, FIG. 4, is connected to a base drive circuit 54 to operate the transistor Q7. In general, Q7 is turned on when the filtered current through the inductor L4 is less than the average real load current of the three phases and when either the PWM inverted signal is in a high state (FIG. 2) or the Q9 control signal is in a high state.

The switch control circuit 36b which controls the transistor Q8 is identical to the circuit 36a, with the exceptions that one of the inputs to the summing junction 42 is from the current sensor 32b, as opposed to the signal from sensor 32a, and that the second input to the AND gate 50 is the Q10 base control signal or the PWM inverted signal, as the case may be.

In the case of the circuitry shown in FIG. 2, the currents through the inductors L4 and L5 are maintained or increased during off periods of the inverter so that a ready source of current is available for the inverter when it is subsequently turned back on.

In the event that the circuitry shown in FIG. 3, is utilized, during the time that regenerative currents have been developed by the load, either or both of the transistors Q11 and Q12 may be off while either or both of the transistors Q9 and Q10 may be on to circulate the regenerative current back through the load. In such a case, either or both of the transistors Q7 and Q8 are turned on to maintain the current flow through the inductors L4 and/or L5. In such a case when the transistors Q9 and Q10 are turned off and the transistors Q11 and Q12 are turned on, a source of current is available to supply the load and maintain the phase voltages at a regulated level.

Regardless of whether the circuitry shown in FIGS. 2 or 3 is utilized, by controlling the current through the inductors L4 and L5 during off periods of the inverter, sufficient current is available to supply the load, even during a fault condition in one of the phases, such as a short circuit. In such a case, enough current is generated to insure that the breakers 23 are tripped to clear a load fault.

Referring again to FIG. 3, the transistors Q7 and Q8 may be eliminated and the function thereof can be assumed by the transistors Q9 and Q10. For example, if a regenerative condition has arisen causing transistor Q11 to be turned off and transistor Q9 turned on and if it is determined that the current in the inductor L4 must be increased to satisfy load requirements, then the transistor Q11 may be turned on to provide a path for this current. In this case, the current available at the output of the inverter is not as great as when the transistors Q7 and Q8 are utilized since the transistor Q9 must handle not only the inductor current but also any regenerative currents.

Furthermore, the present invention may also be used with single ended DC power sources, in which case the transistors Q7 and Q8 would be replaced by a single transistor connected between the rails of the inverter. This transistor is controlled, as before noted, by a single switch control circuit analogous to one of the circuits 32 to maintain current flow through both inductors L4 and L5 when necessary to satisfy load requirements. Also, transistors Q11 and Q12 would be replaced by a single transistor, L4 and L5 by a single inductor and transistors Q9 and Q10 by a single transistor. In other words, one-half the parts are required as compared with the previously described embodiments.

I claim:

1. In an n-phase current source inverter for developing n-phase AC power from a DC source having two terminals each coupled to the inverter through a bus line and a rail associated therewith, a choke coil being connected between one of the bus lines and the associated rail, the inverter being switched between an on state in which current flows from the DC source through the inverter and a load connected thereto, and an off state, the improvement comprising:
a switch coupled between the rail associated with the one bus line and the other bus line;
first means for sensing the current level through the choke coil when the inverter is on;
second means for sensing the current level through the load; and
means connected to the first and second sensing means and the switch for closing the switch when the inverter is off to maintain current flow through the choke coil that sufficient load current is available to supply the load when the inverter is subsequently switched on.

2. The improvement of claim 1 wherein the closing means includes means for operating the switch based on the load current and the choke coil current.

3. The improvement of claim 2, wherein the operating means includes means for comparing the load current with the choke coil current to derive a comparison signal.

4. The improvement of claim 3, wherein the operating means further includes means coupled to the comparing means and the PWM wave for combining the comparison signal with the PWM wave to derive a control signal which assumes a certain state when the inverter is off to close the switch.

5. The improvement of claim 4, wherein the combining means comprises a logical AND gate.

6. The improvement of claim 3, wherein the comparing means includes means for summing the output current with the choke coil current to derive an error signal and a comparator connected to the summing means for comparing the error signal with a reference signal.

7. The improvement of claim 1, wherein the sensing means comprises a non-contacting current sensor.

8. The improvement of claim 1, wherein the sensing means comprises a Hall effect transducer.

9. The improvement of claim 2, wherein the detecting means comprises n current transformers, one for each phase, which develop load current signals representing the current in each phase and means coupled to the current transformers for averaging the current signals to derive a signal representing the load current.

10. In a three-phase current source inverter for developing three-phase AC power to energize a load connected to an inverter output from a DC source having two terminals connected to a first and second DC bus lines, the first DC bus line being coupled through a choke coil to a DC rail, the inverter being switched between on and off states, the inverter being subject to a regenerative condition during which regenerative current is developed by the load, the improvement comprising:

means for disconnecting the choke coil from the DC rail so that the DC source is disconnected from the inverter while the inverter is off and during a regenerative condition; and means for coupling the choke coil to the second DC bus line during the regenerative condition whereby current flows through the choke coil while the inverter is off so that a source of current is available for the inverter when it is subsequently turned on and the first DC bus line is reconnected to the DC rail.

11. The improvement of claim 10, wherein the coupling means includes a switch connected between the choke coil and the second DC bus line, means for sensing the current through the load and means coupled between the sensing means and the switch for operating the switch in accordance with the sensed load current.

12. The improvement of claim 11, wherein the coupling means further includes means for sensing the current through the choke coil, and wherein the operating means further includes means for comparing the load current with the choke coil current to derive a comparison signal.

13. The improvement of claim 12, wherein the disconnecting means includes means for developing a disconnect signal which assumes a certain state when the choke coil is disconnected from the DC rail and wherein the operating means further includes an AND gate having a first inverting input connected to the comparison signal, a second input coupled to the disconnect signal and an output which generates a control signal for operating the switch.

14. The improvement of claim 11, wherein the choke coil current sensing means comprises a Hall effect transducer.

15. The improvement of claim 11, wherein the switch comprises a transistor.

16. The improvement of claim 12, wherein the comparison means includes a summing junction for subtracting the load current from the sensed choke coil current and a comparator connected to the summing junction for comparing the output of the summing junction with a reference to derive the comparision signal.

* * * * *